United States Patent [19]

Saito

[11] Patent Number: 5,010,393

[45] Date of Patent: Apr. 23, 1991

[54] METHOD AND APPARATUS FOR ADJUSTING CHROMA

[75] Inventor: Kenji Saito, Tokyo, Japan

[73] Assignee: Fuji Photo Film Co., Ltd., Kanagawa, Japan

[21] Appl. No.: 385,449

[22] Filed: Jul. 27, 1989

[30] Foreign Application Priority Data

Aug. 30, 1988 [JP] Japan .................. 63-216105

[51] Int. Cl.⁵ .................................. H04N 9/64
[52] U.S. Cl. .................................. 358/29; 358/41
[58] Field of Search .......... 358/29 C, 29, 41, 170–174

[56] References Cited

U.S. PATENT DOCUMENTS

| 4,219,841 | 8/1980 | Nishimura | 358/29 C |
|---|---|---|---|
| 4,739,392 | 4/1988 | Ueda et al. | 358/29 C |
| 4,750,032 | 6/1988 | Nakayama | 358/29 C |
| 4,883,360 | 11/1989 | Kawada et al. | |
| 4,884,128 | 11/1989 | Hieda | 358/29 C |
| 4,922,330 | 5/1990 | Saito et al. | 358/29 C |
| 4,954,884 | 9/1990 | Nakayama et al. | 358/29 C |

FOREIGN PATENT DOCUMENTS

| 0322791 | 7/1989 | European Pat. Off. |
| 0046391 | 2/1989 | Japan . |
| 0055994 | 3/1989 | Japan . |

*Primary Examiner*—Howard W. Britton
*Assistant Examiner*—Michael H. Lee

[57] ABSTRACT

A chroma adjusting method for use in an automatic white balance adjusting method to control the gains of red and blue signals in accordance with signals obtained by photographing an object. In the chroma adjusting method, the chroma information that corresponds to the ratio of high-chroma colors in the entire screen can be found in accordance with signals obtained by photographing an object. The gain of a chroma signal is controlled such that the gain of the chroma signal can be increased as the chroma information is decreased. When there are present many low-chroma colors, the chroma level of the chroma signal can be raised.

20 Claims, 2 Drawing Sheets

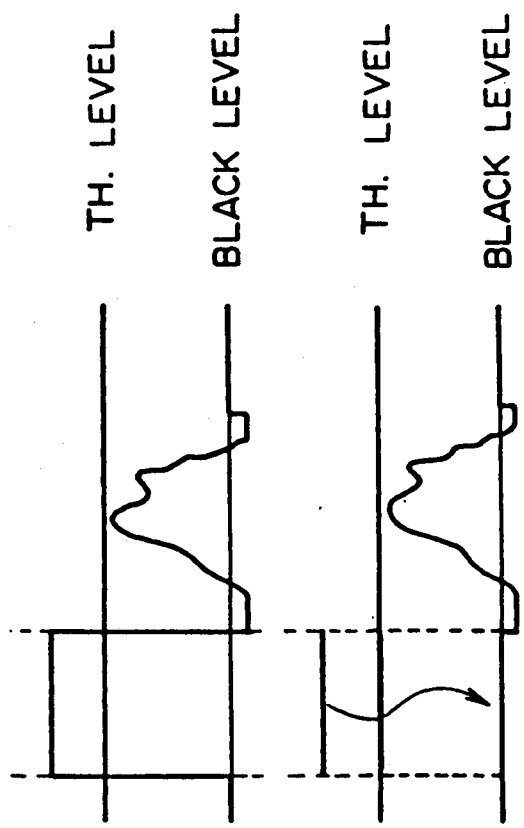
FIG. 2 PICTURE PATERN
FIG. 3 COLOR DIFFERENCE SIGNAL ($E_R - E_Y$)
FIG. 4 COLOR DIFFERENCE SIGNAL AFTER BLANKED ($E_R - E_Y$)

METHOD AND APPARATUS FOR ADJUSTING CHROMA

BACKGROUND OF THE INVENTION

1. Field of the Invention

The present invention relates to a method and apparatus for adjusting chroma and, in particular, to such method and apparatus which can be applied when white balance is automatically adjusted by an internal light measurement system.

2. Description of the Related Art

Conventionally, an automatic white balance adjusting method includes an external light measurement system and an internal light measurement system. In the external light measurement system, color temperatures are measured by an external sensor and the control signal that is obtained from such measurement is used to control the gains of red and blue signals.

On the other hand, the internal light measurement system is a control system which is based on a general fact that averaging of colors on the entire screen provides a grey color. That is, even when a general object is photographed, if the colors are averaged over the entire screen, then there is provided a color which is equivalent to that obtained when a white object is photographed.

In other words, the internal light measurement system is a control system based on a premise that colors in a screen are often distributed equally on the positive and negative sides of axes, (R - Y) and (B - Y). In this control system, color signals $(E_R - E_Y)$ and $(E_B - E_Y)$ are respectively integrated over the entire screen and the gains of red and blue signals are adjusted or controlled so that the resultant integration average value can coincide with a reference level showing a predetermined grey color.

In the above-mentioned automatic white balance adjusting method using the external light measurement system, colors can be reproduced comparatively well even when chroma is low, for instance, when a scene is in the shade, under dark illumination or the like. However, in the automatic white balance adjusting method using the internal light measurement system, it is difficult to reproduce colors well when chroma is low, which is a contemplated problem to be solved.

SUMMARY OF THE INVENTION

The present invention aims at eliminating the drawback found in the above-mentioned conventional internal light measurement type of automatic white balance adjusting method.

Accordingly, it is an object of the invention to provide a method and apparatus for adjusting chroma which is capable of reproducing colors well even when chroma is low, for instance, when the scene is in the shade, under dark illumination or the like, in adjusting white balance automatically by use of an internal light measurement system.

In order to attain the above object, according to the invention, there is provided a chroma adjusting method which can be applied to an automatic white balance adjusting method to control the gains of red and blue signals in accordance with signals obtained by photographing an object, in which chroma information corresponding to the ratio of high-chroma colors in the entire screen is obtained in accordance with the signals obtained by photographing the object, and the gains of chroma signals are controlled in such a manner that the gains of the chroma signals are increased as the chroma information is decreased.

According to an embodiment of the invention, at first, there is obtained chroma information which corresponds to the ratio of high-chroma colors included in the entire screen. The chroma information is low when the scene to be photographed is in the shade and under dark illumination. The gains of chroma signals are adjusted in accordance with the chroma information. That is, the gains of the chroma signals are controlled such that the gains of the chroma signals are increased as the chroma information is decreased, and when there are many low-chroma colors, chroma levels are to be raised.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The exact nature of this invention, as well as other objects and advantages thereof, will be readily apparent from consideration of the following specification relating to the accompanying drawings which are given by way of illustration only, and thus are not limitative of the present invention, and, in which like reference characters designate the same or similar parts throughout the figures thereof, and wherein.

DETAILED DESCRIPTION OF THE INVENTION

Figure 1:
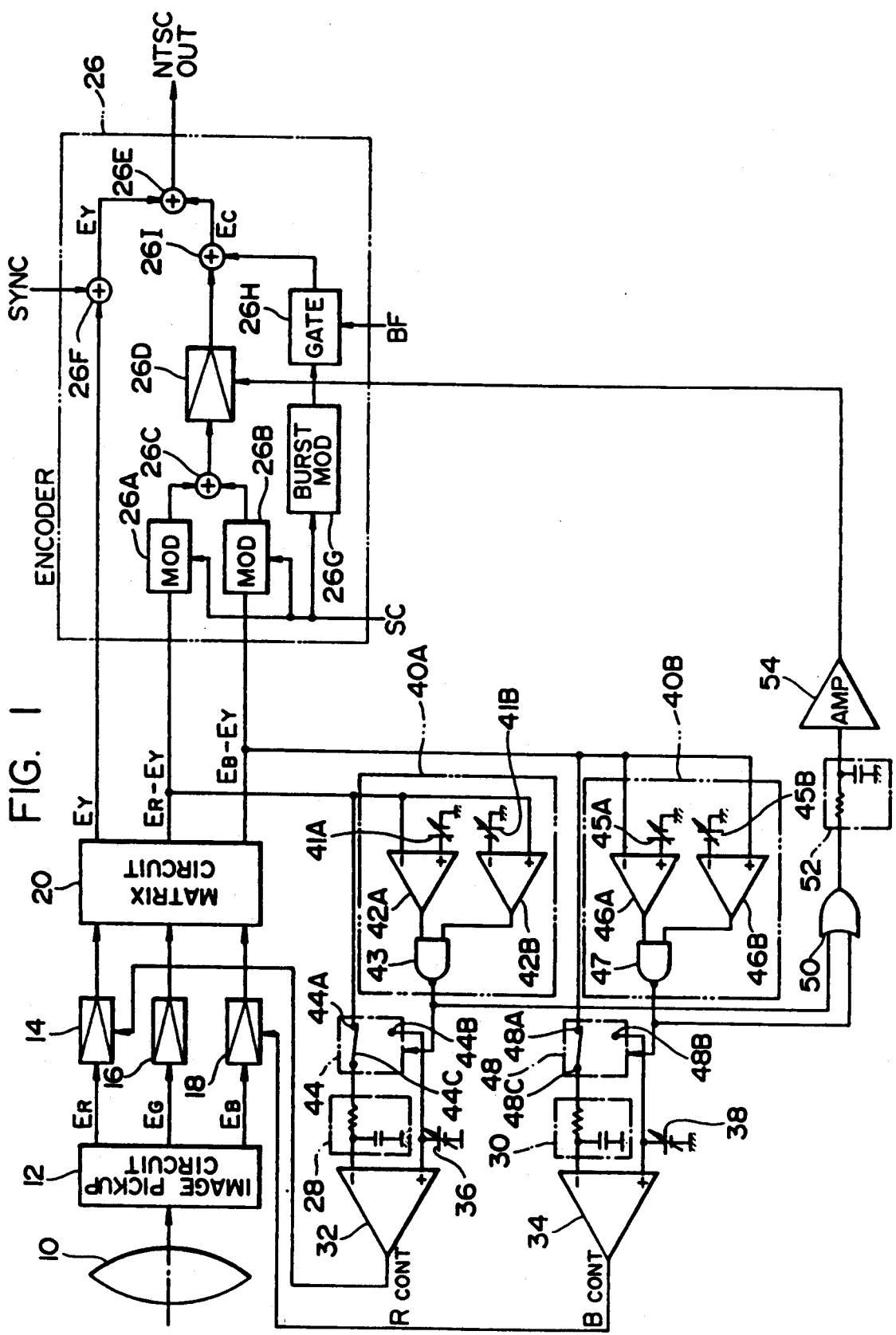
FIG. 1 is a circuit diagram of a camera including a chroma adjusting device according to the invention; and, FIGS. 2 through 4 are, respectively, explanatory views used to illustrate an automatic white balance adjusting device shown in FIG. 1.

Detailed description will hereunder be given of the preferred embodiments of a method and apparatus for adjusting chroma according to the present inventions with reference to the accompanying drawings.

Referring first to FIG. 1, there is shown a circuit diagram of a camera including a chroma adjusting device according to the invention.

In FIG. 1, light entering through a lens 10 is converted through an image pickup element 12 to red, green and blue signals $(E_R, E_G, E_B)$. The signals $(E_R, E_G, E_B)$ are respectively input through amplifiers 14, 16 and 18 to a matrix circuit 20, in which they are converted to a brightness signal $E_Y$, and color difference signals $(E_R - E_Y)$, $(E_B - E_Y)$. As will be described later, the amplifiers 14 and 18 are controlled in gain, whereby an automatic white balance adjustment can be performed.

The brightness signal $E_Y$, and the color difference signals $(E_R - E_Y)$, $(E_B - E_Y)$ are respectively applied to an encoder 26. In the encoder 26, a synchronization signal (SYNC) is added to the brightness signal $E_Y$ by an adder 26F. On the other hand, the color difference signals $(E_R - E_Y)$ and $(E_B - E_Y)$ are respectively input to modulators 26A and 26B to each of which a color subcarrier wave of 3.58 MHZ is applied, in which the color difference signals are respectively two-phase modulated. The thus modulated signals are added together in an adder 26C to provide a chroma signal, which is then transmitted through an amplifier 26D to an adder 26I. In the adder 26I, a burst signal is added to the chroma signal to provide a color signal $E_C$. The amplifier 26D, as will be described later, is controlled in gain, thereby performing a chroma adjustment. The brightness signal $E_Y$ and the color signal $E_C$ are added together in an adder 26E and the resultant signal is output as a video signal in the NTSC system.

Next, description will be given below of an automatic white balance adjusting method (disclosed in the specification of Japanese Patent Application No. 62-202509) in which high-chroma colors are removed from an original picture and only the color information relating to the portions of a screen including achromatic colors such as white, grey and the like is integrated to thereby eliminate mis-controls such as fading, color failure and the like.

At first, the above-mentioned automatic white balance adjusting method is explained in principle.

Now, it is assumed that a color difference signal ($E_R - E_Y$) shown in FIG. 3 has been obtained from a picture including a strong red color as shown in FIG. 2. If the color difference signal is integrated over the entire screen, then the integration average value thereof is moved nearer to the red level than a black level and, in this state, if an automatic white balance adjustment is performed, then the color of the face of a man shown in FIG. 2 is mis-controlled toward the complementary colors (cyanogen, blue) of red.

Thus, in order to blank a color difference signal representing the strong red from the picture shown in FIG. 2, a certain level (which is referred to as a threshold level) is set, and a strong color difference signal which exceeds the threshold level is then blanked to a black level (a DC value to be pedestal clamped, that is, a reference level), as shown in FIG. 3. Due to this, the strong color difference signal is removed from the color difference signal of the original picture so that the average value thereof can be made to come near to a grey color.

Now, in FIG. 1, the color difference signal ($E_R - E_Y$) that is output from the matrix circuit 20 is applied to the contact 44A of a blanking switch 44 and is also applied to a strong color difference signal detection part 40A which is used to detect a high-chroma color (that is, a strong color difference signal).

The strong color difference signal detection part 40A is composed of an upper threshold level setting means 41A for a color difference signal ($E_R - E_Y$), a lower threshold level setting means 41B for a color difference signal ($E_R - E_Y$), comparators 42A, 42B, and a NAND circuit 43.

The upper and lower threshold level setting means 41A and 41B, which are respectively used to set upper and lower threshold levels for blanking the strong color difference signals respectively on the red side and the cyanogen side of the color difference signal ($E_R - E_Y$), respectively output the upper and lower threshold levels.

There are applied to the positive and negative inputs of the comparator 42A the upper threshold level and the color difference signal ($E_R - E_Y$), respectively. The comparator 42A compares these two input signals with each other and, when the color difference signal ($E_R -$ $E_Y$) is found smaller than the upper threshold level, the comparator 42A outputs an H level signal, while it outputs a strong color difference detection signal (that is, an L level signal) when the color difference signal ($E_R - E_Y$) is found larger than the upper threshold level. Also, there are applied to the positive and negative inputs of the comparator 42B the color difference signal ($E_R - E_Y$) and the lower threshold level, respectively. The comparator 42B compares these two input signals with each other and, when the color difference ($E_R - E_Y$) is greater than the lower threshold level, the comparator 42B outputs an H level signal, while it outputs a strong color difference detection signal (an L level signal) when the color difference signal ($E_R - E_Y$) is smaller than the lower threshold level.

The NAND circuit 43 outputs an L level signal when both of signals input thereto from the comparators 42A, 42B are H level signals, that is, when the color difference signal ($E_R - E_Y$) is present between the upper and lower threshold levels, while it outputs an H level signal when at least one of the two input signals is the L level signal, that is, when the color difference signal ($E_R - E_Y$) goes beyond or below the upper threshold level or the lower threshold level (namely, when a strong color difference signal is present).

A blanking switch 44 comprises an input contact 44A for inputting the color difference signal ($E_R - E_Y$), an input contact 44B for inputting a reference level from a reference level setting means 36, and a movable contact piece 44C which can be selectively connected to these two input contacts 44A and 44B. When an L level signal is input therein from the NAND circuit 43, the blanking switch 44 then connects the movable contact piece 44C to the contact 44A to thereby output the strong color difference signal ($E_R - E_Y$) to an integrating circuit 28 and, when an H level signal is input therein from the NAND circuit 43, the switch 44 then connects the movable contact piece 44C to the contact 44B to thereby output the reference level to the integrating circuit 28.

On the other hand, the color difference signal ($E_B - E_Y$) that is output from the matrix circuit 20 is applied to a contact 48A of a blanking switch 48 and is also applied to a strong color difference signal detection part 40B which is used to detect a color difference signal.

The strong color difference signal detection part 40B is constructed similarly to the above-mentioned strong color difference signal detection part 40A. An upper threshold level setting means 45A and a lower threshold level setting means 45B, respectively included in the strong color difference signal detection part 40B, are adapted to set upper and lower threshold levels which are respectively used to blank the strong color difference signals on the blue color side and the yellow color side of the color difference signal ($E_B - E_Y$), respectively. Also, in the part 40B, there are further included comparators 46A, 46B and a NAND circuit 47. However, they are adapted to operate similarly to the before-described comparators 42A, 42B and NAND circuit 43 and thus the detailed description thereof is omitted here.

A blanking switch 48 comprises an input contact 48A for inputting the color difference signal ($E_B - E_Y$), an input contact 48B for inputting a reference level from reference level setting means 38, and a movable contact piece 48C which can be selectively connected to these input contacts 48A and 48B. When an L level signal is input therein from the NAND circuit 47, the blanking switch 48 then connects the movable contact piece 48C to the contact 48A to thereby output the color difference signal ($E_B - E_Y$) to an integrating circuit 30 and, when an H level signal is input therein from the NAND circuit 43, then it connects the movable contact piece 48C to the contact 48B to thereby output a reference level to the integrating circuit 30.

As described above, the integrating circuits 28 and 30 integrate the color difference signals ($E_R - E_Y$) and ($E_B - E_Y$), respectively. However, if the color difference signals are strong color difference signals which go beyond or below the predetermined upper or lower threshold levels, the integrating circuits 28 and 30 blank the strong color difference signals and after then integrate the thus blanked signals (in particular, the reference levels in place of the strong color difference signals), and thereafter input the integration average values to differential amplifiers 32 and 34, respectively.

To the positive inputs of the differential amplifiers 32 and 34, there are input from reference level setting means 36 and 38 the reference levels that are respectively the average values of the color difference signals ($E_R - E_Y$) and ($E_B - E_Y$) obtained when the average values of the colors over the entire screen provide a grey color. The differential amplifier 32 outputs to the amplifier 14 a gain control signal $R_{CONT}$, which can be obtained by amplifying the difference between the above two input signals, to thereby control the gain of a signal $E_R$ to be amplified by the amplifier 14. Also, the differential amplifier 34 outputs to the amplifier 18 a gain control signal $B_{CONT}$, which can be obtained by amplifying the difference between the above two input signals, to thereby control the gain of a signal $E_B$ to be amplified by the amplifier 18.

In this manner, the signals $E_R$ and $E_B$ are controlled so that the average values of the color difference signals ($E_R - E_Y$) and ($E_B - E_Y$) on the entire screen can be made to coincide with their associated reference levels. Also, even when an original picture includes in part a strong color, by taking an average of colors in the picture with the strong color being removed, the average value can be made approach to a grey color, so that a proper white balance adjustment can be made without being influenced by the strong color.

Next, description will be given below of the chroma adjusting method and apparatus according to the present invention.

In FIG. 1, the output signals of the strong color difference signal detection parts 40A and 40B (which provide the H level signals when the strong color difference signal is detected) are respectively applied through an OR circuit 50 to an integrating circuit 52.

Responsive to this, the integrating circuit 52 integrates the input signals and outputs the chroma information that corresponds to the integration value thereof, that is, corresponds to the ratio of the H level signal (a high-chroma color) in one screen (one frame). This chroma information consists of an analog signal having a level existing between the L level and the H level and it increases as the high-chroma colors in one screen are increased. The chroma information is amplified by a linear or non-linear amplifier 54 and is then output to the amplifier 26D which is used to amplify a chroma signal.

The amplifier 26D is composed of a variable gain amplifier, the gain of which can be varied continuously or stepwise by the chroma information input therein through the amplifier 54, that is, the gain thereof is controlled in such a manner that it provides a normal level when the chroma information is large, while, for the small chroma information, the chroma level can be increased.

Thanks to this, even in the shade or under the dark illumination where chroma is low, a good color reproduction can be realized.

In the illustrated embodiment, in order to obtain the chroma information, there are used the signals (blanking information) that are output from the strong color difference detection parts 40A, 40B of the automatic white balance adjusting apparatus. However, this is not always limitative, but any other information can be used, provided that the information represents whether a color is a high-chroma color or not.

Also, the automatic white balance adjusting method is not always limited to the illustrated embodiment, but any of an internal light measurement type will be suitable.

As has been described heretofore, in the chroma adjusting method and apparatus according to the invention, due to the fact that, when there are included many low-chroma colors in one screen, the gain can be controlled so as to increase the level of a chroma signal, a good color reproduction can be realized even in the shade or under dark illumination where chroma is low, and, in particular, the above effect can be expected when white balance is adjusted by means of an internal light measurement system.

It should be understood, however, that there is no intention to limit the invention to the specific forms disclosed, but on the contrary the invention is to cover all modifications, alternate constructions and equivalents falling within the spirit and scope of the invention as expressed in the appended claims.

What is claimed is:

1. An apparatus for adjusting chroma comprising:
   image pickup means, coupled to image signals of a desired scene, for converting said image signals to red, green, and blue color signals;
   color signal amplifier means, coupled to said image pickup means, for amplifying said red, green, and blue color signals;
   matrix means, coupled to said color signal amplifier means, for converting said amplified red, green and blue color signals to a brightness signal and first and second color difference signals;
   video signal producing means, coupled to said matrix means, for combining said first and second color difference signals to produce a chroma signal and for amplifying said chroma signal in a chroma amplifier to provide as output an amplified chroma signal;
   strong color difference signal detection means, coupled to said matrix means, for detecting when both of said first and second color difference signals exceed a predetermined range of acceptable levels and for outputting strong color difference signals indicative thereof; and
   chroma information detecting means, coupled to said strong color difference signal detection means, for combining said strong color difference signals and for outputting a chroma indicative signal of a level corresponding to the level of high chroma colors present in said desired scene,
   said chroma amplifier controlled in response to said chroma indicative signal to have a normal chroma gain level when said level of high chroma colors is high and to have a high chroma gain level when said level of high chroma colors is low.

2. The apparatus for adjusting chroma of claim 1, said video signal producing means further comprising:
first and second modulating means, coupled to said matrix means, for respectively modulating said first and second color difference signals with a color subcarrier to provide respective first and second modulated color difference signals; and
first adder means, coupled to said first and second modulating means, for adding said first and second modulated color difference signals to produce said chroma signal.

3. The apparatus for adjusting chroma of claim 2, said video signal producing means further comprising:
second adder means, coupled to said chroma amplifier, for adding a burst signal to said amplified chroma signal to output a color signal;
third adder means, coupled to said matrix means, for adding a synchronization signal to said brightness signal to output a synchronized brightness signal; and
fourth adder means, coupled to said second and third adder means, for adding said color signal and said synchronized brightness signal to output a resultant video signal.

4. The apparatus for adjusting chroma of claim 3, said first and second modulating means respectively two-phase modulate said first and second color difference signals.

5. The apparatus for adjusting chroma of claim 2, said color subcarrier is 3.58 MHz.

6. The apparatus for adjusting chroma of claim 1, said chroma information detecting means comprising:
an OR gate, coupled to said strong color difference signal detection means, for performing an OR operation with respect to said strong color difference signals and outputting a strong color indicative signal; and
integrating means, coupled to said OR gate, for integrating said strong color indicative signal and for outputting said chroma indicative signal.

7. The apparatus for adjusting chroma of claim 6, said chroma information detecting means further comprising amplifying means for amplifying said chroma indicative signal.

8. The apparatus for adjusting chroma of claim 1, said strong color difference signal detection means comprising:
first detecting means, coupled to said matrix circuit, consisting of
first comparator means, coupled to said first color difference signal and a first upper level threshold, for outputting a first threshold signal,
second comparator means, coupled to said first color difference signal and a first lower level threshold, for outputting a second threshold signal, and
a first NAND gate, coupled to said first and second threshold signals, for performing a NAND function and outputting a first of said strong color difference signals; and
second detecting means, coupled to said matrix circuit, consisting of
third comparator means, coupled to said second color difference signal and a second upper level threshold, for outputting a third threshold signal,
fourth comparator means, coupled to said second color difference signal and a second lower level threshold, for outputting a fourth threshold signal, and
a second NAND gate, coupled to said third and fourth threshold signals, for performing a NAND function and outputting a second of said strong color difference signals.

9. A method of adjusting chroma, for use in an automatic white balance adjusting method for controlling the gains of red and blue signals in accordance with signals obtained by photographing an image, comprising the steps of:
determining chroma information corresponding to the ratio of high-chroma colors of the photographed image; and
controlling the gain of a chroma signal of the photographed image to
increase the gain of said chroma signal in response to a low ratio of high-chroma colors, and
adjust the gain of said chroma signal to a normal level in response to a high ratio of high-chroma colors.

10. An apparatus for adjusting chroma, for use in an automatic white balance adjusting apparatus for controlling the gains of red and blue signals in accordance with signals obtained by photographing an image, the chroma adjusting apparatus comprising:
gain control means for controlling a gain of a chroma signal;
detection means, in accordance with signals obtained by the photographing of the image, for detecting high-chroma colors exceeding a preset level;
chroma information means, in accordance with a detection output of said detection means, for determining chroma information corresponding to a ratio of said high-chroma colors in the photographed image; and
means for inputting said chroma information and for determining said gain of said gain control means such that said gain is increased as said ratio of high-chroma colors is decreased.

11. An apparatus for adjusting chroma, as set forth in claim 10, said detection means comprising:
first and second level setting means, respectively, for setting upper and lower limit levels used to generate a first strong color difference signal representing a high-chroma color with respect to a first color difference signal generated from said signals obtained by the photographing of the image;
third and fourth level setting means, respectively, for setting upper and lower limit levels used to generate a second strong color difference signal representing a high-chroma color with respect to a second color difference signal generated from said signals obtained by the photographing of the image;
first comparing means, coupled to said first color difference signal and said upper and lower limit levels respectively set by said first and second level setting means, for outputting said first strong color difference signal when said first color difference signal is beyond the limits of said upper and lower limit levels indicative of a high-chroma color; and
second comparing means, coupled to said second color difference signal and said upper and lower limit levels respectively set by said third and fourth level setting means, for outputting said second strong color difference signal when said second color difference signal is beyond the limits of said upper and lower limit levels indicative of a high-chroma color.

12. An apparatus for adjusting chroma, as set forth in claim 11, said chroma information means further comprising integrating means, coupled to said first and second strong color difference signals, for integrating said first and second strong color difference signals to output a signal corresponding to said ratio of said high-chroma colors.

13. A method of adjusting chroma comprising the steps of:
   converting image signals of a photographed image into red, green, and blue color signals in an image pickup means;
   amplifying said red, green, and blue color signals in a color signal amplifying means;
   converting said amplified red, green, and blue color signals into a brightness signal and first and second color difference signals in a matrix means;
   combining said first and second color difference signals into a chroma signal in a video processing means;
   amplifying said chroma signal in a chroma amplifier;
   detecting, in a detection means, when both of said first and second color difference signals exceed a predetermined range of acceptable levels to generate strong color difference signals indicative of the level of high-chroma colors present in said photographed image; and
   adjusting the gain of said chroma amplifier, according to said strong color difference signals, to increase said gain in response to a low level of high-chroma colors and to maintain said gain at a normal level in response to a high level of high chroma colors.

14. The method of adjusting chroma of claim 13, further comprising the step of integrating said strong color difference signals.

15. The method of adjusting chroma of claim 13, further comprising the steps of:
   adding a synchronization signal to said brightness signal in a first adder;
   adding a burst signal to said amplified chroma signal in a second adder; and
   adding outputs of said first and second adders, in a third adder, to generate a resultant video signal.

16. An apparatus for adjusting chroma comprising:
   first means for converting image signals of a photographed image into a brightness signal and first and second color difference signals;
   signal processing means, coupled to said first means, for combining said first and second color difference signals into a chroma signal and for amplifying said chroma signal;
   strong color detection means, coupled to said first means, for determining when said first and second color difference signals exceed a predetermined range to produce strong color signals indicative thereof; and
   chroma information means, coupled to said strong color detection means, for determining the level of high-chroma colors in said photographed image based upon said strong color signals and for outputting a chroma information signal to control said signal processing means to amplify said chroma signal with an increased gain level in response to a low-level of high-chroma colors and with a normal gain level in response to a high-level of high-chroma colors.

17. The apparatus for adjusting chroma of claim 16, said signal processing means comprising:
   modulation means, coupled to said first means, for two-phase modulating said first and second color difference signals to generate respective first and second modulated color difference signals;
   a first adder, coupled to said modulation means, for adding said first an second modulated color difference signals to generate a first added signal; and
   chroma amplification means, coupled to said first adder and said chroma information means, for amplifying said first added signal in accordance with said chroma information signal.

18. The apparatus for adjusting chroma of claim 17 said signal processing means further comprising:
   a second adder, coupled to said first means, for adding said brightness signal to a synchronization signal to generate a second added signal;
   a third adder, coupled to said chroma amplification means, for adding said amplified chroma signal with a burst signal to generate a third added signal; and
   a fourth adder, coupled to said second and third adders, for adding said second and third added signals to generate a resultant video signal.

19. The apparatus for adjusting chroma of claim 16, said chroma information means comprising:
   an OR gate, coupled to said strong color detection means, for performing an OR operation with respect to said strong color signals to produce a gate output signal; and
   integration means, coupled to said OR gate, for integrating said gate output signal to produce said chroma information signal.

20. The apparatus for adjusting chroma of claim 19, said chroma information means further comprising amplification means for amplifying said chroma information signal.

* * * * *